United States Patent
von Widdern et al.

(10) Patent No.: US 6,908,649 B1
(45) Date of Patent: Jun. 21, 2005

(54) COEXTRUDED, AT LEAST 3-LAYERED, BIAXIALLY STRETCHED TUBULAR FILM WITH INNER PA LAYER

(75) Inventors: Michael Hennig-Cardinal von Widdern, Walsrode (DE); Gunter Weber, Fallingbostel (DE)

(73) Assignee: Wolff Walsrode AG, Walsrode (DE)

( * ) Notice: Subject to any disclaimer, the term of this patent is extended or adjusted under 35 U.S.C. 154(b) by 0 days.

(21) Appl. No.: 08/301,523

(22) Filed: Sep. 7, 1994

Related U.S. Application Data

(63) Continuation of application No. 07/931,162, filed on Aug. 17, 1992, now abandoned.

(30) Foreign Application Priority Data

Aug. 23, 1991 (DE) .................................. P 41 28 081

(51) Int. Cl.$^7$ .................. A23B 4/005; B29D 23/00; B65D 85/72
(52) U.S. Cl. .............. 428/34.8; 428/474.7; 428/474.9; 428/476.1; 428/476.9; 426/105; 426/127; 426/129; 426/243
(58) Field of Search ......................... 428/34.8, 34.9, 428/474.7, 474.9, 476.1, 476.9, 518, 474.6; 426/105, 127, 129, 243

(56) References Cited

U.S. PATENT DOCUMENTS

| | | | | |
|---|---|---|---|---|
| 4,695,491 A | | 9/1987 | Kondo et al. .............. 428/34.9 |
| 4,764,406 A | * | 8/1988 | Hisazumi et al. .......... 428/34.8 |
| 4,851,245 A | * | 7/1989 | Hisazumi et al. ......... 428/475.5 |
| 4,855,183 A | * | 8/1989 | Oberle ....................... 428/34.9 |
| 4,908,272 A | | 3/1990 | Harada et al. .............. 428/412 |
| 4,911,979 A | | 3/1990 | Nishimoto et al. ......... 428/332 |
| 4,944,970 A | * | 7/1990 | Stenger et al. ............. 428/34.8 |
| 5,059,481 A | * | 10/1991 | Lustig et al. .............. 428/34.9 |
| 5,185,189 A | * | 2/1993 | Stenger et al. ............. 428/34.8 |
| 5,219,002 A | * | 6/1993 | Stenger et al. ............. 428/34.8 |
| 5,480,690 A | * | 1/1996 | Stenger et al. ............. 428/34.8 |

FOREIGN PATENT DOCUMENTS

| | | |
|---|---|---|
| DE | 4001612 | 1/1990 |
| EP | 0277839 | 2/1988 |
| EP | 0288972 | 4/1988 |
| GB | 2025839 | 8/1978 |
| NL | 8400915 | 3/1984 |

\* cited by examiner

*Primary Examiner*—Rena L. Dye
(74) *Attorney, Agent, or Firm*—Norris McLaughlin & Marcus PA

(57) ABSTRACT

This invention relates to a coextruded biaxially stretched tubular film for the durable and crease-free covering of goods packaged in the liquid or pasty state, in particular foodstuffs such as sausage-meat for boiling or cooking or soft cheese, which are heated during and/or after they are packaged.

2 Claims, No Drawings

COEXTRUDED, AT LEAST 3-LAYERED, BIAXIALLY STRETCHED TUBULAR FILM WITH INNER PA LAYER

This application is a continuation, of application Ser. No. 07/931,162, filed Aug. 17, 1992, now abandoned.

This invention relates to a coextruded, biaxially stretched tubular film for the durable and crease-free wrapping of goods packaged in a liquid or pasty state, in particular foodstuffs such as sausage-meat for boiling or cooking and soft cheese.

Wrappings for foodstuffs such as sausage-meat or other goods packaged by the same or similar processes must fulfil numerous requirements if they are to be suitable for use.

These requirements are as follows:

a) Recovery Power

Both cooling of the previously heated packaged material and the weight loss due to evaporation of water during storage are accompanied by a reduction in volume of the packaged goods. The film must continue to cling without creasing to the contents of the package in spite of the reduction in volume in order to preserve the attractive, saleable appearance of the goods.

b) Strength

The material to be packaged is forced at high speed into the tubular film under a filling pressure of up to 1.6 bar. After the application of pressure, the material of the film should not bulge in places, and there should not occur localized increase in width (diameter). The quality of the film must ensure that the high filling pressure mainly produces an elastic deformation of the tubular film.

c) Temperature Resistance

The wrapping must be able to tolerate temperature/tension so that it will withstand the pressure applied by the contents without excessive deformation even during the cooking process.

d) Barrier Properties

The tubular film intended for use inter alia as skin for sausages which are to be boiled or otherwise cooked must have good barrier properties against permeation by oxygen and water vapour.

The oxygen barrier prevents premature greying of the sausage-meat facing the inside of the film.

The barrier against water vapour prevents the weight loss of the goods due to evaporation of water from the filling, which would not only reduce the saleable value of the product but could also produce unsightly creases due to the loss in volume.

e) Adherence between the Film and Meat

The tubular film is required to have so-called meat adherence if it is to be used as skin for sausages which are to be boiled or cooked. By "meat adherence" is meant the capacity of the covering to adhere to the contents. The affinity between the covering and the contents prevents the deposition of jelly.

f) Gathering into Folds

Before the tubular film is subjected to industrial processing in automatic filling machines, it is formed into a gathered tube. In this process, the tubular film is folded along the axis of the tube and then compressed in the ratio of from 30:1 to 60:1. The film must be able to withstand the extremely high buckling stress without suffering damage.

g) Compliance with Food Regulations

The product must, of course, only contain materials which are classified as harmless by the food product regulations and recommendations.

h) Ecology

The product should only be composed of materials which are ecologically harmless in their manufacture, processing and use as well as in their subsequent disposal as waste.

No biaxially stretched tubular films of thermoplastic resins have hitherto been known which fulfil all these extensive requirements in every point. The progressive reduction in the use of packaging materials containing chlorine forces the manufacturer and processor of synthetic sausage skins made of VDC/VC copolymers to offer alternative packaging materials. Since the stretched film of VDC/VC copolymer was able to fulfil the requirements of "strength", "oxygen barrier", "water vapour barrier" and "meat adherence" with only one polymer, the manufacturers of the films were prepared to pay a relatively high price for the VDC/VC copolymer as raw material. Further development of the coextrusion technique, on the other hand, now enables the combination of polymer properties to be realised in the coextrusion composition with less expensive polymers.

The manufacturer of tubular films is interested in reliable and inexpensive means of producing a product which satisfies the quality requirements of the user, on the one hand to reduce the wastage rate as far as possible and provide a reproducible quality of film and on the other hand to offer a highly refined product at a low cost.

The known process for the manufacture of biaxially stretched tubular films is composed of the following process steps:

Plastication of the thermoplastic polymers

Conversion of the melt into tubular form

Rapid cooling of the molten primary tube to a solid state in order to suppress the formation of crystallites as far as possible Reheating of the primary tube to a suitable temperature for biaxial stretching Biaxial stretching of the reheated primary tube by application of a pressure difference between the interior of the tube and the surroundings of the tube and by the application of a longitudinal pull to assist stretching in the longitudinal direction Thermofixing of the biaxially stretched tubular film Rolling up of the tubular film Various finishing steps depending on the subsequent use of the film (e.g. cutting, printing, gathering, etc.).

Biaxial stretching is understood by the man of the art to be the transverse and longitudinal stretching of the thermoplastic extrudate at temperatures from the glass transition temperature to the melting temperature. Biaxial stretching may be carried out by means of, for example, a bladder filled with a cushion of gas or fluid under pressure and enclosed gas-tightly or fluid-tightly between two pairs of rollers rotating at different circumferential speeds. Whereas the ratio of the different circumferential roller speeds corresponds to the degree of longitudinal stretching, the degree of transverse stretching is calculated from the ratio of the diameter of the tube in the stretched state to its diameter in the unstretched state. The degree of increase in surface area due to stretching is the product of the degree of longitudinal stretching multiplied by the degree of transverse stretching.

During the stretching process, the molecules of the tubular film which is in the solid state align themselves in such a manner that the modulus of elasticity and the strength are considerably increased.

A tubular film is sufficiently strong if, when used as a packaging skin, it undergoes mainly elastic deformation during the filling process and during sterilization. The skin must preserve its cylindrical form and must not bulge out or curve.

Biaxial stretching of tubular films of partially crystalline thermoplastic polymers such as polyamide or polyvinylidene chloride requires rapid cooling of the molten primary tube because the developing crystalline superstructure would otherwise interfere with the subsequent biaxial stretching. This obstruction to biaxial stretching is recognised in practice by the fact that the stretching bladder is agitated, i.e. the neck of the bladder travels in alternating directions along the axis of the tube, with the result that the diameter of the tubular end product is not uniform.

Plentiful advice and information is given in the patent literature for the processing of partially crystalline aliphatic polyamide (PA) to form biaxially stretched films and the subsequent use of the latter as skin for cooking and boiling sausages. The advice given includes both technical solutions for the manufacturing process of the biaxially stretched tubular films and developments of formulations for obtaining improved properties for practical application.

DE 2 850 181 indicates that improved stretching can be obtained by the addition of olefinic copolymers to the PA. According to the information given by the patentee, this is recognised by an optically clearly detectable increase in the uniformity of the stretching bladder and by a considerable reduction in the stretching forces required.

The water vapour barrier of films having a PA matrix can be substantially improved by the addition of olefinic (co)polymers or other polymers which are less permeable to water vapour than aliphatic polyamides. Compared with skins of PVDC copolymers, however, the water vapour barrier must be regarded as insufficient and therefore requiring improvement. In the processing of polymer blends, difficulties frequently arise in obtaining a constant quantity of product since the distribution of the components of the blend in the matrix has an important influence on the stretching capacity and the barrier properties. Owing to the fact that the quality of the distribution depends on a very large number of parameters of the process (e.g. viscosities of the components of the blend, processing temperatures, rates of stretching, geometry of the screw, etc.), a reproducible quality of product is extremely difficult to obtain.

The improvement obtained in the water vapour barrier of single layered tubes of PA film by employing the technique of blending results from the incorporation of the components of the blend over a flat area in the PA matrix. The size of the incorporated areas is influenced in particular by the degree of biaxial stretching of the film.

The components thus incorporated over an area do not form a complete layer of film and therefore cannot reduce the permeation by water vapour to the same extent as is possible by employing the coextrusion technique. For a given quantity of material used, therefore, a substantially improved water vapour barrier is obtained by using the coextrusion technique. This provides both economical and ecological advantages.

Similar procedures are described in documents EP 0 216 094 and DE 3 801 344.

According to EP 0 216 094, an improved oxygen barrier combined with high permeability to substances carrying smoke flavours can be obtained by the addition of ethylene vinyl alcohol copolymers (EVOH) to the PA. In addition to the difficulties outlined above of obtaining a reproducible quality of product, the inadequate temperature stability of EVOH results in unwanted degradation of the latter when mixed with polyamides, which are processed at a high temperature.

DE-OS 3 801 344 describes a biaxially stretched tubular film of a ternary blend. Whereas the greater proportion by weight of the film is due to aliphatic PA, proportions of polyterephthalic acid esters and aromatic PA are also added. According to the Applicant, the object of this structure of blend is to obtain a homogeneous distribution of colour pigment in the film, which can be achieved by preparing a coloured master batch containing the aromatic PA and subsequently mixing this with the other components.

This structure of film, like all other single layered films based on aliphatic polyamides previously mentioned, fails to fulfil the requirements of the producers for reliable reproducibility as well as the requirements of the processor for a high barrier action against the permeation of water vapour and oxygen.

If the quality of tubular film demanded by the user is to be obtained under economically and ecologically favourable conditions, this can only be achieved with coextruded stretched tubular films.

Japanese Application J 1 014 032 describes a biaxially stretched coextruded tubular film of 3 layers as skin for boiling and cooking sausages, in which the outer layer facing away from the contents consists of an aliphat8ic PA and the inner layer consists of an ethylene/acrylic acid copolymer. The middle layer of PP or PE copolymers between the outer and the inner layer serves as bonding medium. The inner polymer layer of ethylene/acrylic acid copolymer assumes the function of meat adherence. According to a subsequent Application, GB 2 205 273, the meat adherence of the internal layer of LLDPE is improved by an expensive corona pretreatment acting on the inside of the tubular film.

It was an object of the present invention to provide the user with an ecologically acceptable biaxially stretched tubular film with improved barrier action and improved properties for use.

The present invention relates to a coextruded, biaxially stretched tubular film for covering goods which are to be packaged in the liquid or pasty state, in particular foodstuffs, which film in its filled state covers its contents without creasing and without any visible effects from oxygen for a considerable period of storage due to its barrier action against water vapour and oxygen, and the inner layer of which film, facing the contents, has meat adherence, characterised in that the film consists of at least 3 layers comprising at least one layer of olefinic (co)polymer as outer layer,
a core layer of at least one oxygen blocking layer of EVOH, (partially) aromatic (co)polyamide and/or aliphatic (co)polyamide and
an inner layer of at least one layer of aliphatic (co)polyamide.

The high barrier action against oxygen and water vapour results from the combination of the barrier properties of the individual polymer layers, the interfaces of the individual layers and the molecular superstructure due to the manufacturing technique entailing biaxial stretching and thermofixing, and it does not require the additional incorporation of chlorine-containing barrier layers of PVC or PVDC.

In a preferred embodiment, Polyamide-6 or copolyamides containing a predominant proportion of caprolactam are used as inner layer (1). These polyamides may be processed alone or as a polymer mixture with one another or as a polymer mixture with other polymers, e.g. with (partially) aromatic polyamides, PE(copolymers), PP(copolymers), polyesters, etc. with a predominant proportion of PA.

In a particularly preferred embodiment, the thickness of the inner PA layer is from 15 to 30 $\mu$m.

The arrangement of the layer of aliphatic PA as inner layer facing the filling has numerous advantages:

1. Polyamide ensures good meat adherence.
2. The high melting point of PA ensures that the inner layer of the tube remains solid even at the high cooking temperature during the sterilization process.
3. The lower optimum stretching temperature of the inner layer of PA compared with the outer layer of olefinic polymers enables the primary tube (PS) to be heated within a very short time. When PS is briefly heated to a high temperature, a temperature profile becomes established over the total layer thickness of the PS due to the low thermal conductivity of the thermoplastic polymers. With optimized process parameters and well adapted choice of polymers, the individual layers stretch at the optimum polymer specific stretching temperature. This enables the length of heating path to be considerably reduced apart from making the stretching process more uniform.

4. The flexibility of the composite film can be improved by watering the inner PA layer without the water evaporating while the film is temporarily kept in storage (outer olefinic water vapour barrier).

The glass transition temperature of the PA can be reduced to below 0° C. by the absorption of water by the inner PA layer, with the result that the film has a whole becomes softer.

The flexibility of the film is of major importance for finishing processes (such as clipping and gathering into folds) because the film is subjected to extreme buckling stresses in these processes. The buckling stress may cause the film to tear during the finishing process or to develop permanent creases over the contents of the tube.

In a preferred embodiment, watering is carried out in line with the extrusion, stretching and tempering process by introducing a water bladder into the tubular film between two pairs of rollers. The second pair of rollers (at outlet end of film) has a small gap which ensures that small quantities of water are continuously carried along. The absorption of water up to saturation of the inner PA then takes place while the rolled end product is temporarily stored. The water treatment does not impair the process of printing on the tubular film since the outer, olefinic layer on which printing is to be carried out acts as a barrier to water vapour.

If the finished goods are packaged in a moisture-proof packing, the customer (packager of contents of the tube) will receive the film in a state ready for filling.

The watering of the film which is conventionally carried out before the filling process in the meat processing industry (with the object of improving the flexibility) may be omitted. As this processing step is frequently a source of defects due to the variation in watering time (incomplete absorption of water), the variation in water temperature (shrinkage solution, differing speeds of water absorption), prevention of the absorption of water by the printing ink and contamination of the film by impure water, the possibility of delivering the product to the industry in a form ready for filling is very desirable.

The middle or core layer (2) of the tubular film according to the invention consists of EVOH copolymers, (partially) aromatic PA and/or aliphatic PA. This layer in particular has the function of acting as oxygen barrier.

The outer layer is formed by olefinic (co)polymers and has in particular the function of water vapour barrier. The water vapour barrier of the olefinic layer reduces the amount of weight loss of filling occurring over a 2 to 3 weeks' period of storage to a level corresponding to that of fillings enclosed in PVDC skin.

Further, arrangement of the olefinic layer as the outer layer enables the inner PA layer to be watered in line with the extrusion process without the water evaporating during the usual periods of temporary storage before further finishing processes are carried out.

Olefinic (co)polymers based on ethylene and propylene are used.

It is surprisingly found that there is no harm in the optimum stretching temperature of the outer olefinic layer being higher than that of the inner PA layer. When this layer has a high stretching temperature, the primary tube which is to be stretched may be briefly heated with a high temperature air jet. This results in a temperature profile across the wall thickness of the PS with the outer layer being at a higher temperature than the inner layer.

The maximum degree of increase in surface area obtainable by stretching (degree of longitudinal stretching x of transverse stretching) is generally greater in films of polyolefinic polymers than in films of polyamides. When the composite film according to the invention is stretched, the degree of increase in surface area by stretching depends on the polyamide layer(s) and may reach values of from 6 to 12.

In the production of multilayered tubular films, the PA dominates not only in the obtainable degree of surface stretching but also in fixing the stretching parameters such as the internal pressure of the bladder and the heating temperature and length of heating path.

Bonding layers may be inserted between the layers (1)–(2) and (2)–(3). The bonding layers have a chemical and/or physical affinity for the adjacent layers so that their bonding action is preserved after the process of biaxial stretching and the cooking process. PE and PP copolymers containing functional groups are particularly suitable for this purpose.

The bonding layers also function as additional water vapour barriers. It is particularly when EVOH is used as oxygen barrier layer that an improvement in the oxygen barrier under conditions of high atmospheric moisture is obtained due to the encapsulation by water vapour barrier on both sides.

Penetration by oxygen causes greying of the meat on the surface of the boiling or cooking sausage visible to the consumer. Advanced greying imparts an unsightly appearance to the goods, which renders it less saleable. This is particularly noticeable when goods differing in their manufacturing date lie side-by-side on the shelf.

EXAMPLES

The Examples given below were realised on a coextrusion line for a 5-layered tube. Plastication and homogenisation of the polymers used was carried out by means of 5 separate extruders.

When the composite film was formed by only 4 polymer layers (with varying functions), 2 identical types of polymers were placed side by side.

Example 1

Polymers (A), (B1), (B2), (C1), (D) are plasticized and homogenised separately from one another by 5 extruders and converted into the tubular form by means of a 5-layer coextrusion die.

The tubular film has the following structure from the outside to the inside:
1) A/B1/C1/B2/D Polymer A is a polypropylene copolymer containing ethylene units (Eltex PKL 415 of Solvay), Polymer B1 has the function of a bonding agent (HV) and is a PP copolymer containing functional groups (Admer QF 551 of Mitsui)

Polymer C1 is an ethylene/vinyl alcohol copolymer (EVAL EP F101 BZ of Kuraray),

Polymer BZ has the function of a bonding agent (HV) and is a PE copolymer containing functional groups (Admer QF 551 of Mitsui)

Polymer D is a Polyamide 6 (B40F of Bayer).

The tubular coextrudate leaving the die is chilled both from the outside and the inside with water adjusted to 10° C. The cooling water in the interior of the tube is squeezed off by a tightly closing pair of rollers.

This pair of rollers also serves to draw the melt out of the die. Complete removal of the residual moisture from the outer surface of the primary tube (PS) is carried out by means of a mechanical stripping device and an air jet.

The unstretched PS thus obtained has a diameter of 25 mm and the following distribution of layer thickness from the outside to the inside:

A=200 µm, B1=50 µm, C1=100 µm, B2=50 µm, D=200 µm.

After about 1 second's reheating with an air jet at 145° C., the PS is stretched biaxially, 3.3-fold in the transverse direction and 3.1-fold in the longitudinal direction, by the inclusion of an air bladder between two pairs of rollers rotating at different circumferential speeds. The biaxial stretching takes place at a stage when the primary tube is at a much higher temperature on its outer surface than on its inner surface of PA.

The biaxially stretched tubular film passes for 15 seconds through a heat treatment zone maintained at 160° C. (incomplete thermofixing), again between two gas-tightly closing pairs of rollers, shrinkage being largely prevented during this process by a cushion of gas under pressure acting from the inside. The biaxially stretched, heat-treated tubular film thus obtained has a total layer thickness of 58 µm.

The fluctuation in width when the tubular film is laid flat is less than 1 mm over a period of observation of 30 minutes.

Before the subsequent test for performance in use is carried out, the tubular film is printed over its whole surface and then gathered into folds with the aid of a lubricant oil for folding. The gathered tubes are packaged moisture-tightly so that the internal PA layer does not dry out during the intermediate period of storage.

For the test for performance in use, the finished tubular film is filled with liver sausage-meat without having previously been watered and it is then cooked for 45 minutes at 75° C., placed under a shower of cold water and finally completely cooled in the cold storage house.

The tubular film forms a smooth and tight wrapping round the sausage-meat and shows no signs of creasing in the form of gathered folds.

The weight losses by evaporation of water over a storage period of 20 days are 0.15% by weight. The liver sausage-meat undergoes no greying on its side facing the film. The film can easily be peeled off from its filling in the form of a spiral.

Examples 2 and 3

In Examples 2 and 3, the core layer of EVOH (Example 1) is replaced by (partially) aromatic PA (C2) or PA 6.12 (C3). The following structures are then obtained in the respective Examples:
2) A/B1/C2/B2/D
3) A/B1/C3/B2/D
Primary tubes having the following distribution of layer thicknesses are produced by the same process as in Example 1:

A=200 µm, B1=50 µm, C2/C3=100 µm, B2=50 µm, D=200 µm.

The biaxially stretched, heat-treated tubular film has a total layer thickness of 58 µm.

The fluctuation in width of the tubular film when laid flat is less than 1.2 mm over a period of observation of 30 minutes.

Subsequent processing steps such as watering, printing and gathering into folds and the test for performance in use are carried out as described in Example 1.

The results of the investigation for performance in use are summarized in Table 1.

Examples 4 and 5

The film structures from Examples 4 and 5 are almost identical to those from Examples 2 and 3, the difference being that the bonding layers (B2) are omitted without being replaced by other layers.

The tubular films therefore have the following structures, from the outside to the inside:
4) A/B1/C2/D
5) A/B1/C3/D
Primary tubes having the following distribution of layer thicknesses are produced by the same process as in Example 1:
A=200 µm, B1=50 µm, C2/C3=100 µm, D=200 µm.

The biaxially stretched, heat-treated tubular film has a total layer thickness of 54 µm.

The fluctuations in width of the tubular film laid out flat is less than 1.3 mm over a period of observation of 30 minutes.

The subsequent processing steps such as watering, printing, and gathering into folds and the test for performance in use are carried out as described in Example 1.

The results of the investigation into performance in use are summarized in Table 1.

Comparison Examples

Samples of film corresponding to Examples 1 to 5 were tested as Comparison Examples (V 6 to V 10). The difference lies in the omission of the watering step after the heat treatment. In contrast to the finished tubular films from Examples 1 to 5 which were ready for filling, the gathered tubes (V 6 to V 10) were watered over a period of 15 minutes at 20° C. before being filled with sausage-meat.

Other comparison samples in the form of single-layered, biaxially stretched PA 6 tubes which were subjected to watering after the heat treatment were also tested. V 11 is a tubular film of PA 6 and V 12 is a tubular film of a polymer blend: PA 6 (85% by weight) and ethylene/acrylic acid copolymer (15% by weight).

Table to Patent Project No. III

| Example No. | Film structure | Finished ready for filling | Adherence of printing ink | Gathering into folds | Gathering creases | "fit" of the film | Weight loss | Greying of meat |
|---|---|---|---|---|---|---|---|---|
| | | | | | | Assessment of the film after tests for performance in use | After 20 days' storage | |
| 1 | Co-PP/HV/EVOH/HV/PA6 | yes | very good | very good | none | smooth and tight | 0.15 | none |
| 2 | Co-PP/HV/arom.PA/HV-/PA6 | yes | very good | very good | none | smooth and tight | 0.2 | none |

-continued

Table to Patent Project No. III

| Example No. | Film structure | Finished ready for filling | Adherence of printing ink | Gathering into folds | Gathering creases | "fit" of the film | After 20 days' storage Weight loss | Greying of meat |
|---|---|---|---|---|---|---|---|---|
| 3 | Co-PP/HV/PA6.12/HV/-/PA6 | yes | very good | very good | none | smooth and tight | 0.2 | none |
| 4 | Co-PP/HV/arom.PA/PA6 | yes | very good | very good | none | smooth and tight | 0.3 | none |
| 5 | Co-PP/HV/PA6.12/PA6 | yes | very good | very good | none | smooth and tight | 0.3 | none |
| V 6 | Co-PP/HV/EVOH/HV/PA6 | no | very good | moderate | visible | smooth | 0.1 | none |
| V 7 | Co-PP/HV/arom.PA/HV/-PA6 | no | very good | moderate | none | smooth | 0.2 | none |
| V 8 | Co-PP/HV/PA6.12/HV/-PA6 | no | very good | moderate | none | smooth | 0.2 | none |
| V 9 | Co-PP/HV/arom.PA/PA6 | no | very good | moderate | none | smooth | 0.3 | none |
| V 10 | Co-PP/HV/PA6.12/PA6 | no | very good | moderate | none | smooth | 0.3 | none |
| V 11 | PA6 | yes | poor | good | none | smooth and tight | 1.3 | slight |
| V 12 | Polymer blend:PA6(85% by wt) + EMAA(15% by wt) | yes | poor | good | visible | smooth and tight | 0.7 | slight |

What is claimed is:

1. A multilayered biaxially stretched tubular film for covering goods in the liquid or pasty state, which undergo a heat treatment after the filing, the tubular film consisting of at least the three following strata:

an outer stratum comprising at least one water vapor barrier layer of an olefinic polymer a core stratum comprising at least one oxygen barrier layer of a partially aromatic polyamide produced by polycondensation of meta-xylylene diamine and adipic acid, and an inner stratum which comprises at least one layer containing an aliphatic polyamide.

2. A method of making a packaged cooked foodstuff which comprises packaging the food before cooking in a multilayered, biaxially stretched tubular film consisting of at the three following strata:

an outer stratum comprising at least one water vapor barrier layer of an olefinic polymer a core stratum comprising at least one oxygen barrier layer of an ethylene/vinyl alcohol copolymer or a partially aromatic polyamide, and an inner stratum which comprises at least one layer containing an aliphatic polyamide and thereafter cooking.

* * * * *